(12) United States Patent
Kobayashi et al.

(10) Patent No.: US 11,258,351 B2
(45) Date of Patent: Feb. 22, 2022

(54) POWER CONVERTER

(71) Applicant: DENSO CORPORATION, Kariya (JP)

(72) Inventors: Naoto Kobayashi, Nisshin (JP); Seiji Iyasu, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/910,772

(22) Filed: Jun. 24, 2020

(65) Prior Publication Data
US 2020/0403527 A1    Dec. 24, 2020

(30) Foreign Application Priority Data
Jun. 24, 2019  (JP) .............................. JP2019-116784

(51) Int. Cl.
| | | |
|---|---|---|
| *H02M 1/32* | (2007.01) | |
| *H02M 7/797* | (2006.01) | |
| *H02M 1/00* | (2006.01) | |
| *H02M 1/42* | (2007.01) | |
| *H02M 3/158* | (2006.01) | |

(52) U.S. Cl.
CPC .............. *H02M 1/32* (2013.01); *H02M 7/797* (2013.01); *H02M 1/007* (2021.05); *H02M 1/0009* (2021.05); *H02M 1/0025* (2021.05); *H02M 1/4233* (2013.01); *H02M 3/158* (2013.01)

(58) Field of Classification Search
CPC ............. H02M 1/0009; H02M 1/0025; H02M 1/0064; H02M 1/007; H02M 1/32; H02M 1/4225; H02M 1/4266; H02M 3/155–1588; H02M 7/217–2195; H02M 7/797; H02H 7/1213; H02H 7/122–1257
See application file for complete search history.

(56) References Cited

U.S. PATENT DOCUMENTS

| | | | |
|---|---|---|---|
| 2013/0058134 A1 | 3/2013 | Yamada et al. | |
| 2015/0333637 A1* | 11/2015 | Izumi | H02M 1/32 363/21.01 |
| 2016/0079873 A1* | 3/2016 | Inoue | H01F 27/245 363/21.04 |
| 2017/0309395 A1 | 10/2017 | Shiraki et al. | |

(Continued)

FOREIGN PATENT DOCUMENTS

| | | |
|---|---|---|
| JP | 2010-104233 A | 5/2010 |
| JP | 2011-130572 A | 6/2011 |

(Continued)

*Primary Examiner* — Fred E Finch, III
(74) *Attorney, Agent, or Firm* — Oliff PLC

(57) ABSTRACT

A control unit determines a polarity of an actual voltage value of an AC power supply if it is either positive or negative based on a detection voltage thereof detected by the voltage detector. The control unit alternately actuates a set of a first switch and a fourth switch and another set of the second switch and a third switch each time when it is determined that the polarity of the actual voltage value of the AC power supply changes. A second reactor is disposed at at least one of first and second positions. The first position is located between a first AC side terminal and a connection point located between the first switch and the second switch. The second position is located between a second AC side terminal and a connection point located between the third switch and the fourth switch.

8 Claims, 11 Drawing Sheets

(56) References Cited

U.S. PATENT DOCUMENTS

| | | | |
|---|---|---|---|
| 2017/0361711 A1* | 12/2017 | Fukushima | B60L 1/00 |
| 2018/0034386 A1* | 2/2018 | Okuda | H02M 1/32 |
| 2018/0109193 A1* | 4/2018 | Hirota | H02M 7/219 |
| 2019/0157974 A1 | 5/2019 | Tomita et al. | |
| 2019/0229645 A1 | 7/2019 | Iyasu et al. | |
| 2019/0305671 A1* | 10/2019 | Matsuura | H02M 1/083 |
| 2020/0052576 A1* | 2/2020 | Murakami | H02M 3/158 |
| 2020/0169187 A1 | 5/2020 | Kobayashi et al. | |

FOREIGN PATENT DOCUMENTS

| | | |
|---|---|---|
| JP | 2011-130573 A | 6/2011 |
| JP | 2015-112543 A | 6/2015 |
| JP | 2015-139337 A | 7/2015 |
| JP | 2015-186407 A | 10/2015 |
| JP | 2015-198460 A | 11/2015 |
| JP | 2016-115864 A | 6/2016 |
| JP | 2020-182341 A | 11/2020 |
| WO | 2013/042539 A1 | 3/2013 |

* cited by examiner

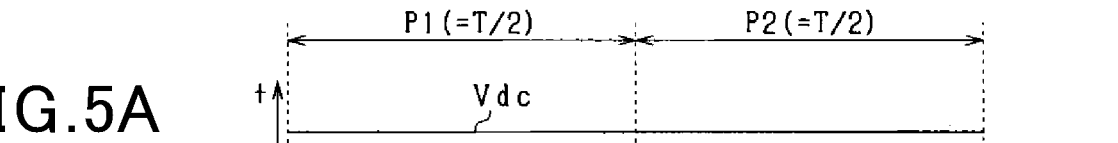
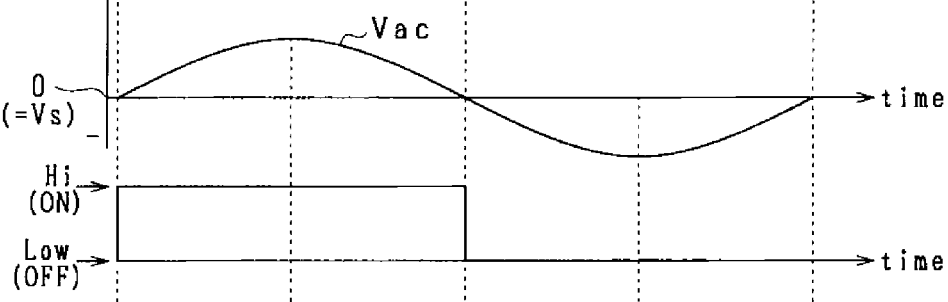
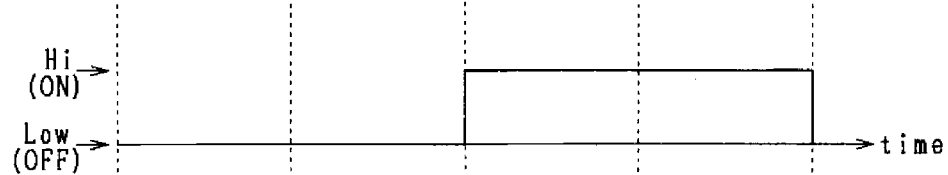
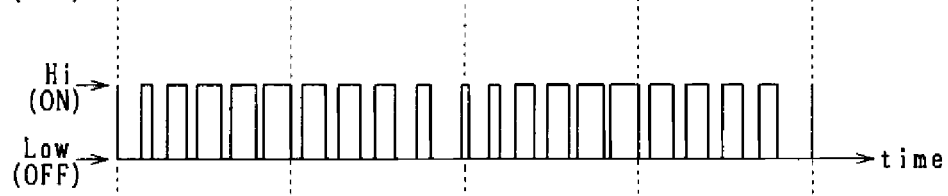
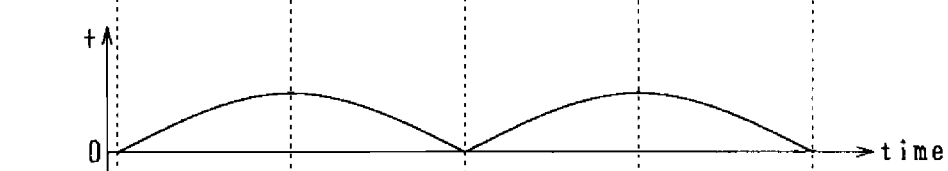
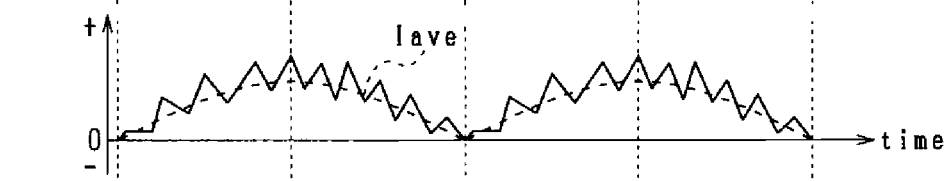
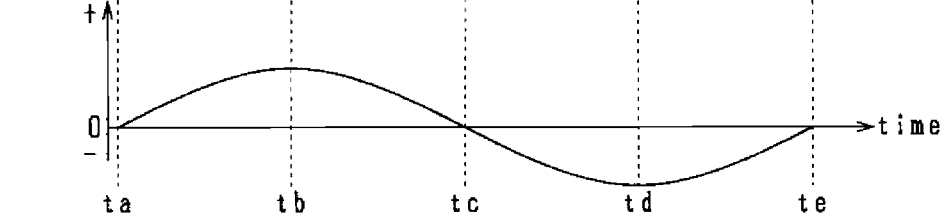

Vac, Vr

GS1, GS4

GS2, GS3

Iac

POWER CONVERTER

CROSS-REFERENCE TO RELATED APPLICATION

This patent application is based on and claims priority to Japanese Patent Application No. 2019-116784 filed on Jun. 24, 2019 in the Japan Patent Office, the entire disclosure of which is hereby incorporated by reference herein.

BACKGROUND

Technical Field

The present disclosure relates to a power converter having a full bridge circuit.

Related Art

As discussed in a Japanese Patent Application Laid Open NO. 2015-198460 (JP-2015-198460-A), to control a reactor current flowing through a reactor disposed in an AC-DC converter to approximate a command current, a well-known controller actuates one or more drive switches by performing peak current mode control. Such a controller reduces a distortion of an output current by acquiring a voltage of an alternating current (herein after simply referred to as AC) power supply as a detection voltage and adding a current correction value varying in accordance with a phase of the detection voltage to the command current.

Further, in a power converter, a timing when a polarity of an actual voltage of an AC power supply is changed is determined based on a detection voltage detected by a voltage detector. Then, in synchronization with this timing, the power converter alternately actuates a set of switches that execute turn on-operation among multiple switches constituting a full bridge circuit. However, with the power converter, due to occurrence of a vertical offset and phase shift in the detection voltage from the actual voltage, a switching timing of switching from the set of switches to be turned on to that to be turned off is sometimes deviated from a timing when the polarity of the actual voltage changes. As a result, a short circuit is formed in the full bridge circuit by including the set of turned on switches and a diode connected in reverse parallel to the set of turned off switches, thereby possibly causing an overcurrent flowing through the short circuit.

The present invention is made to address the above-described problems and an object thereof is to provide a power converter capable of either suppressing or reducing an overcurrent flowing through a power converter composed of a full bridge circuit.

SUMMARY

Accordingly, the present disclosure provides a novel power converter that includes a first reactor, a first AC side terminal connectable to an AC power supply and a second AC side terminal connectable to an AC power supply. The power converter also includes a first DC side terminal connectable to a DC power supply; a second DC side terminal connectable to the DC power supply; and a full bridge circuit disposed between each of the first and second AC side terminals and the first reactor. The full bridge circuit has a first serial coupling composed of a series of a first switch and a second switch and a second serial coupling composed of a series of a third switch and a fourth switch. The first and second serial connection bodies are connected in parallel to each other. The full bridge circuit also has four diodes connected to the first to fourth switches in reverse parallel to the first to fourth switches, respectively. The full bridge circuit also has a first connection point located between the first switch and the second switch in a wiring. The first connection point is connected to the first AC side terminal. The full bridge circuit also has a second connection point located between the third switch and the fourth switch in the wiring. The second connection point is connected to the second AC side terminal. The power converter also includes a voltage detector to detect a voltage of an AC power supply. The power converter further includes a second reactor disposed at at least one of first and second positions. The first position is located between the first AC side terminal and the connection point located between the first switch and the second switch in a wiring. The second position is located between the second AC side terminal and the connection point located between the third switch and the fourth switch in the wiring.

A control unit is provided to perform at least one of first and second functions. The control unit converts an AC voltage supplied from an AC power supply through each of the first and second AC side terminals into a DC voltage and outputs a conversion result through each of the first and second DC side terminals as the first function. The control unit converts a DC voltage input through each of the first and second DC side terminals into an AC voltage and outputs a conversion result through each of the first and second AC side terminals as the second function. The control unit determines a polarity of an actual voltage value of the AC power supply if it is either positive or negative based on a detection voltage of the AC power supply detected by the voltage detector. The control unit alternately actuates a set of the first switch and the fourth switch and another set of the second switch and the third switch each time when it is determined that the polarity of the actual voltage value of the AC power supply changes.

Hence, according to the above-described one aspect of the present disclosure, the second reactor is disposed at least one of two positions: a first position between the first AC side terminal and the connection point located between the first switch and the second switch in a wiring, and a second position between the second AC side terminal and the connection point located between the third switch and the fourth switch in the wiring. Accordingly, a change in current flowing into the first and second AC side terminals is either suppressed or reduced by an inductance of the second reactor. With this, a flow of overcurrent can be either suppressed or reduced even when a switching timing for switching a set of switches between the set of switches to be turned on and that to be turned off deviates from a timing when a polarity of an actual voltage of the AC power supply changes.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIGS. 5A to 5G are timing charts collectively illustrating an exemplary operation performed by the power converter according to one embodiment of the present disclosure;

DETAILED DESCRIPTION

Figure 1:
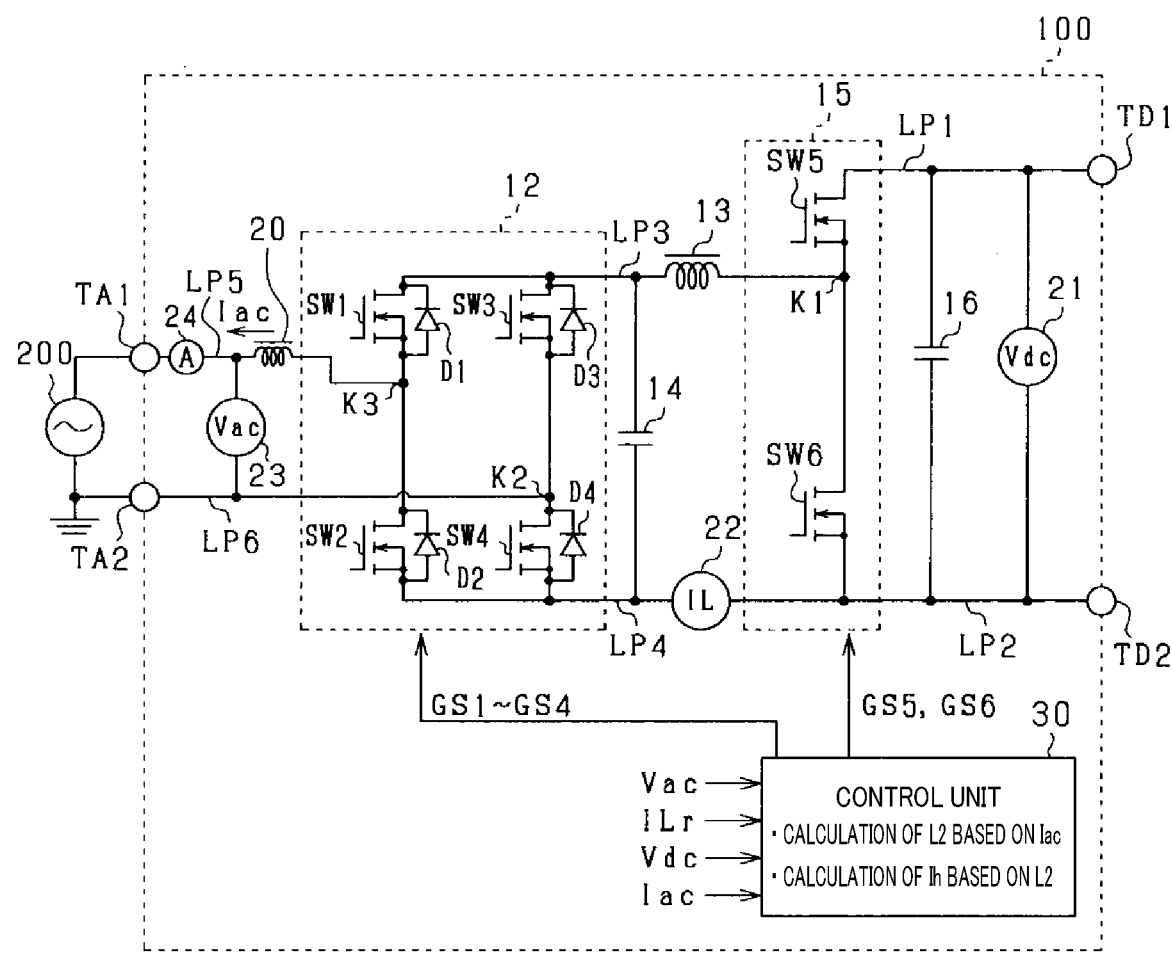
FIG. 1 is a diagram illustrating an exemplary configuration of a power converter according to one embodiment of the present disclosure.

Referring now to the drawings, wherein like reference numerals designate identical or corresponding parts throughout the several views thereof, and to FIG. 1 and applicable drawings, one embodiment of a power converter will be herein below described.

In short, according to this embodiment, the power converter converts a DC power supplied from a DC power supply through a DC side terminal into an AC power and supplies a conversion result to an AC power supply.

That is, as shown in FIG. 1, a direct current (hereinbelow simply referred to as DC) power supply (not shown) is connected to first and second DC side terminals TD1 and TD2 included in the power converter 100. The AC power supply 200 is, for example, a commercial power supply. The DC power supply is, for example, either a battery or a DC-DC conversion circuit. Also, an AC power supply 200 is connected to first and second AC side terminals TA1 and TA2 as well. The AC power supply 200 is, for example, a commercial power supply. The DC power supply is, for example, either a battery or a DC-DC conversion circuit.

The power converter 100 includes a capacitor 16, a half bridge circuit 15 and an intermediate capacitor 14. The power converter 100 also includes a first reactor 13, a full bridge circuit 12 and a first to sixth wirings LP1 to LP6.

A first end of the first wiring LP1 is connected to the first DC side terminal TD1. A first end of the second wiring LP2 is connected to the second DC side terminal TD2. The first wiring LP1 and the second wiring LP2 are connected to each other via the capacitor 16.

Further, the half bridge circuit 15 is connected to second ends of the first and second wirings LP1 and LP2. The half bridge circuit 15 includes a fifth switch SW5 and a sixth switch SW6. Each of the fifth and sixth switches SW5 and SW6 is a voltage-driving switch composed of an N-channel MOSFET (Metal Oxide Semiconductor Field Effect Transistor) in this embodiment. Further, a source of the fifth switch SW5 and a drain of the sixth switch SW6 are connected to each other. A drain of the fifth switch SW5 is connected to the first wiring LP1. A source of the sixth switch SW6 is connected to the second wiring LP2.

Further, the half bridge circuit 15 and the full bridge circuit 12 are connected to each other via the third wiring LP3 and the fourth wiring LP4. Further, a first end of the third wiring LP3 is connected to a first connection point K1 located between a source of the fifth switch SW5 and a drain of the sixth switch SW6. Further, a first reactor 13 is disposed in the third wiring LP3. A first end of the fourth wiring LP4 is connected to a source of the sixth switch SW6. Each of second ends of the third and fourth wirings LP3 and LP4 is connected to the full bridge circuit 12. The third wiring LP3 and the fourth wiring LP4 are connected to each other via the intermediate capacitor 14.

Further, the full bridge circuit 12 includes first to fourth switches SW1 to SW4. Each of the first to fourth switches SW1 to SW4 is a voltage-driving switch composed of an N-channel MOSFET in this embodiment. As shown, a source of the first switch SW1 and a drain of the second switch SW2 are connected to each other. A source of the third switch SW3 and a drain of the fourth switch SW4 are connected to each other. Each of drains of the First and third switches SW1 and SW3 is connected to the third wiring LP3. Similarly, each of sources of the second and fourth switches SW2 and SW4 is connected to the fourth wiring LP4. As shown, the first to fourth switches SW1 to SW4 are disposed with first to fourth body diodes D1 to D4 respectively arranged in reverse parallel to each other.

Further, A second connection point K2 disposed between a source of the third switch SW3 and a drain of the fourth switch SW4 is connected to a first end of the sixth wiring LP6. A second end of the sixth wiring LP6 is connected to a second AC side terminal TA2. A third connection point K3 disposed between the first switch SW1 and the second switch SW2 is connected to a first end of the fifth wiring LP5. A second end of the fifth wiring LP5 is connected to the first AC side terminal TA1.

Further, the power converter 100 also includes a DC voltage detector 21, a reactor current detector 22 and an AC voltage detector 23. The DC voltage detector 21 is disposed between the first and the second wirings LP1 and LP2 to connect these wirings to each other. The DC voltage detector 21 detects a DC voltage Vdc upon receiving a voltage through each of the first and second DC side terminals TD1 and TD2. The reactor current detector 22 is disposed in the fourth wiring LP4 and detects a current flowing through the first reactor 13 as a reactor current ILr. The AC voltage detector 23 is disposed between the fifth and sixth wirings LP5 and LP6 to connect these wirings to each other and detects a voltage of the AC power supply 200 as a detection voltage Vac.

Figure 2:
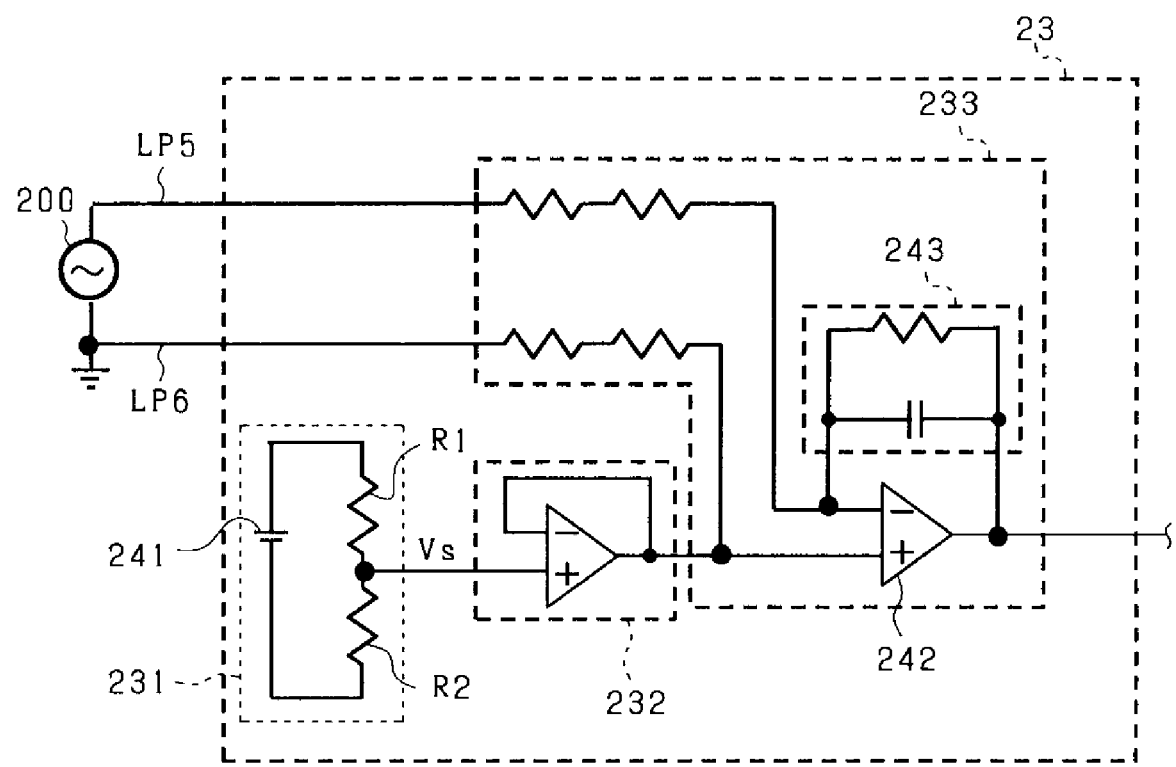
FIG. 2 is a diagram illustrating an exemplary circuit constituting an AC voltage detector according to one embodiment of the present disclosure.

Further, as shown in FIG. 2, the AC voltage detector 23 has a reference voltage generator 231, a voltage follower 232 and a differential amplifier 233. The reference voltage generator 231 includes a series-connection body composed of a series of resistances R1 and R2 and a low voltage power source 241. With this, the reference voltage generator 231 outputs a reference voltage Vs by dividing a voltage supplied from the low voltage power source 241 using the series of resistances R1 and R2. The reference voltage Vs acts as a reference for a detection voltage Vac generated by the AC voltage detector 23. More specifically, the reference voltage Vs is a detection voltage Vac obtained when an actual voltage Vr of the AC power supply 200 becomes zero (i.e., 0 volt). Further, the AC power supply 200 is connected to an inverting input terminal disposed in an operational amplifier 242 included in the differential amplifier 233 via the fifth wiring LP5. The AC power supply 200 is also connected to a non-inverting input terminal of the operational amplifier 242 via the sixth wiring LP6. The inverting input terminal and an output terminal disposed in the operational amplifier 242 are connected to each other via a low-pass filter 243. Hence, a reference voltage Vs output from the reference voltage generator 231 is input to the non-inverting input terminal of the operational amplifier 242 via the voltage follower 232. The operational amplifier 242 outputs a detection voltage Vac around the reference voltage Vs in accordance with an actual voltage Vr of the AC power supply 200.

Further, in this embodiment, a polarity of the detection voltage Vac is predetermined as described below. That is, a polarity of a detection voltage Vac is regarded to be positive when a voltage of the first AC side terminal TA1 is greater than a voltage of the second AC side terminal TA2. By contrast, a polarity of a detection voltage Vac is regarded to be negative when a voltage of the second AC side terminal TA2 is greater than a voltage of the first AC side terminal TA1.

Further, as illustrated in FIG. 1, the power converter 100 also includes an output current detector 24 for detecting a current flowing through each of the first and second AC side terminals TA1 and TA2 as an output current Iac. In this embodiment, the output current detector 24 is disposed in the fifth wiring LP5. Here, a polarity of the output current Iac flowing in a direction from the first AC side terminal TA1 to the second AC side terminal TA2 through the AC power supply 200 is defined as being positive. By contrast, a polarity of an output current Iac flowing in a direction from the second AC side terminal TA2 to the first AC side terminal TA1 through the AC power supply 200 is defined as being negative. A detection value obtained by each of the detectors 21 to 24 is input to the control unit 30.

Further, the control unit 30 turns on and off each of the first to sixth switches SW1 to SW6. Here, each of functions of the control unit 30 may be realized, for example, by software stored in a non-transitory tangible recording medium (e.g., a memory), a computer that executes the software and a hardware. Each of the functions of the control unit 30 may also be realized by a combination of these devices.

Further, to control an average of an acquired reactor current ILr to approximate a command current ILa* calculated based on a detection voltage Vac, the control unit 30 turns on and off the fifth and sixth switches SW5 and SW6 by performing peak current mode control. Also, among a set of the first and fourth switches SW1 and SW4 and a set of the second and third switches SW2 and SW3, the control unit 30 turns on the set of the first and fourth switches SW1 and SW4 during a period during which a polarity of the actual voltage Vr is positive. By contrast, the control unit 30 turns on the set of the second and third switches SW2 and SW3 during a period during which a polarity of the actual voltage Vr is negative.

Now, various functions performed by the control unit 30 will be herein below described with reference to FIG. 3. Specifically, the control unit 30 includes a phase estimater 31, a waveform generator 32 and a multiplier 33. The control unit 30 also includes an absolute value calculator 34, a first adder 35 and a current corrector 40. The control unit 30 further includes a current controller 50. Hence, in this embodiment, the control unit 30 acts as a first current acquirer.

Further, the phase estimater 31 estimates a phase θ of a detection voltage Vac based on the detection voltage Vac using the below described exemplary estimation method. That is, the phase estimater 31 counts one cycle of a detection voltage Vac (i.e., an angle of 360 degrees) and estimates the phase θ based on a count value counted in this way. In this embodiment, a timing when the detection voltage Vac exceeds the reference voltage Vs, the phase θ is regarded as being an angle of zero. By contrast, a timing when the voltage Vac falls below the reference voltage Vs, the phase is regarded as being an angle of 180 degrees.

Further, the waveform generator 32 generates a reference waveform sin θ of the detection voltage Vac based on the phase θ of the detection voltage Vac estimated by the phase estimater 31. The reference waveform sin θ indicates a change in voltage per half cycle (T/2) of the detection voltage Vac and varies substantially at the same cycle as the detection voltage Vac with an amplitude of the numeral 1. In this embodiment, the reference waveform sin θ has substantially the same phase as the detection voltage Vac.

Further, the multiplier 33 multiplies an amplitude command value Ia* and the reference waveform sin θ together. Here, the amplitude command value Ia* is a command value for determining an amplitude of the reactor current ILr. Further, the absolute value calculator 34 generates an absolute value of an output from the multiplier 33 as a pre-correction command current IL*. Hence, in this embodiment, the phase estimater 31, the waveform generator 32, the multiplier 33 and the absolute value calculator 34 collectively act as the command value calculator.

Further, the current corrector 40 generates a current correction value Ic used to correct the pre-correction command current IL* in order to suppress distortion of an output current Iac as described herein below. That is. a configuration of the current corrector 40 according to this embodiment is specifically illustrated in FIG. 4. Specifically, when a DC voltage is converted into an AC voltage, a deviation width Δi indicating a difference between an average value Iave of a reactor current ILr having distortion and a pre-correction command current IL* is smallest in the vicinity of a zero-cross timing of an actual voltage Vr. Such a deviation width Δi is a factor of distortion of the output current Iac. However, the deviation width Δi can be calculated using the below described first equation. That is, the average value Iave of the reactor current ILr is subtracted from the pre-correction command current IL*. A method of deriving the first equation will be described later in detail.

$$\Delta i = \text{ms} \cdot \frac{\sqrt{2}\,Vrms \cdot |\sin\theta|}{Vdc} \cdot Tsw + \frac{\sqrt{2}\,Vrms \cdot |\sin\theta|(Vdc - \sqrt{2}\,Vrms \cdot |\sin\theta|)}{2(L1+L2)Vdc} \cdot Tsw \quad \text{(First Equation)}$$

Hence, when a DC voltage is converted into an AC voltage by using the above-described first equation, the deviation width Δi becomes minimum at a zero-cross timing of the actual voltage Vr and becomes maximum at a peak timing of the actual voltage Vr. Hence, by calculating the current correction value Ic in accordance with the deviation width Δi calculated by using the above-described first equation, the distortion of the output current Iac can be either suppressed or reduced.

Figure 4:
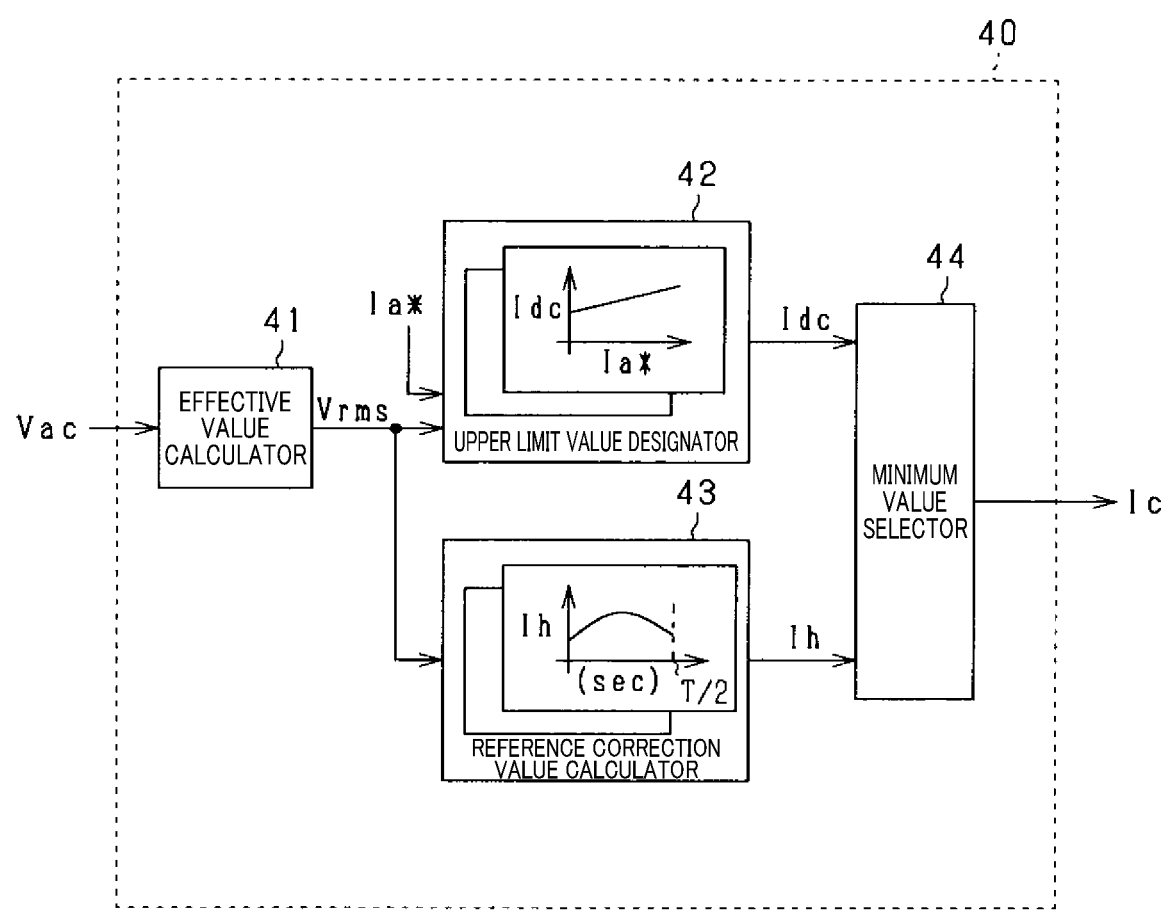
FIG. 4 is a block diagram illustrating of an exemplary configuration of a current corrector according to one embodiment of the present disclosure.

Further, as shown in FIG. 4, the current corrector 40 includes an effective value calculator 41, an upper limit value designator 42 and a reference correction value calculator 43. The current corrector 40 also includes a minimum value selector 44. Here, the Effective value calculator 41 calculates an effective value Vrms of the actual voltage Vr.

Further, the upper limit value designator 42 generates an upper limit value Idc based on the effective value Vrms and the amplitude command value Ia*. Since an amount of increase in reactor current ILr becomes greater as the amplitude command value Ia* increases, the upper limit value designator 42 generates a larger upper limit value Idc as the amplitude command value Ia* increases. Further, since a duty ratio at which the fifth switch SW5 is turned on is increased and thereby increasing the deviation width as the effective value Vrms increases, the upper limit value designator 42 generates a relatively large upper limit Idc.

Further, in this embodiment, the upper limit value designator 42 has a DC component map showing a relation between an amplitude command value Ia* and an upper limit Idc per effective value Vrms. For example, each of the effective values Vrms is adapted to an effective value Vrms of a commercial power supply used in each country. Hence, the upper limit value designator 42 can generate (and use) the upper limit value Idc in accordance with the amplitude command value Ia* with reference to the DC component map prepared per effective value Vrms.

Further, the reference correction value calculator 43 generates (and uses) a reference correction value Ih based on the effective value Vrms. In this embodiment, the reference correction value Ih generated by the reference correction value calculator 43 becomes minimum either at a zero-cross timing of the actual voltage Vr or in the vicinity thereof. By contrast, the reference correction value Ih becomes maximum at a peak timing (of the actual voltage Vr). Specifically, the reference correction value Ih varies as time elapses. Further, in this embodiment, although the reference correction value Ih is predetermined to be zero at the zero-cross timing of the actual voltage Vr, the present disclosure is not limited thereto and it may be predetermined to be greater than zero at the zero-cross timing of the actual voltage Vr.

Further, the reference correction value calculator 43 has a correction value map including a record of a reference correction value Ih per effective value Vrms. In each of the correction value maps, the reference correction value Ih is predetermined to increase as the effective value Vrms increases.

Subsequently, a minimum value selector 44 selects and uses a smaller value as a current correction value Ic between the upper limit value Idc generated by the upper limit value designator 42 and the reference correction value Ih generated by the reference correction value calculator 43. Hence, if the reference correction value Ih is less than the upper limit value Idc, the reference correction value Ih is selected and used as the current correction value Ic. By contrast, if the reference correction value Ih is equal to or more than the upper limit value Idc, the upper limit value Idc is selected and used as the current correction value Ic.

Figure 3:
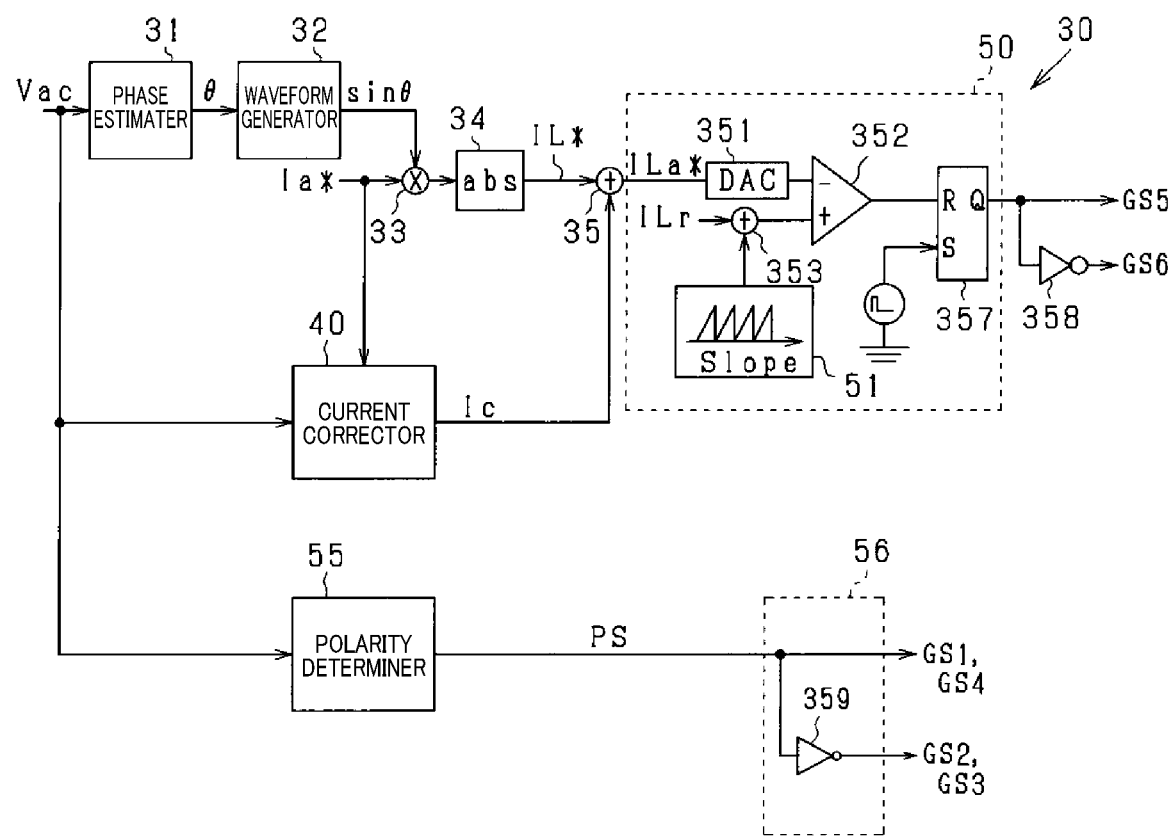
FIG. 3 is a block diagram illustrating an exemplary function performed by a controller according to one embodiment of the present disclosure.

Then, as shown in FIG. 3, the adder 35 adds the current correction value Ic to the pre-correction command current IL* thereby generating a command current ILa* base on such a total amount.

Further, the current controller 50 outputs a fifth gate signal GS5 for actuating the fifth switch SW5 and a sixth gate signal GS6 for actuating the sixth switch SW6 based on the reactor current ILr and the command current ILa*. In view of this, the current controller 50 includes a DA converter 351, a comparator 352 and another second adder 353. The current controller 50 also includes an RS flip-flop 357 and a slope compensator 51. Further, the command current ILa* is input to the DA converter (DAC) 351. The DA converter 351 then converts the input command current ILa* from a digital state (i.e., a digital value) to an analog state (i.e., an analog value). The command current ILa* converted into the analog value is then input to an inverting input terminal disposed in the comparator 352. The second adder 353 adds both the reactor current ILr and a slope compensation signal Slope generated by the slope compensator 51 and outputs such a total as a compensated reactor current ILr. An output from the second adder 353 is then input to a non-inverting input terminal disposed in the comparator 352. Here, the slope compensation signal Slope is utilized to suppress or reduce oscillation caused due to variation in current flowing through the first reactor 13.

Further, the comparator 352 compares the command current ILa* with the reactor current ILr and inputs a low state signal to a R-terminal disposed in the RS flip-flop 357 during a period during which the reactor current ILr is smaller than the command current ILa*. By contrast, the comparator 352 inputs a high state signal to the R-terminal of the RS flip-flop 357 during a period during which the reactor current ILr is greater than the command current ILa*. Further, clock signals are input to a S-terminal of the RS flip-flop 357. One cycle of the clock signals corresponds to a single switching cycle Tsw in which each of the fifth and sixth switches SW5 and SW6 is actuated.

Further, a Q-terminal disposed in the RS flip-flop 357 is connected to a gate disposed in the fifth switch SW5. A signal output from the Q-terminal to the gate of the fifth switch SW5 serves as the fifth gate signal GS5. Also, such an output terminal of the RS flip-flop 357 is connected to a gate disposed in the sixth switch SW6 via an inverter 358. A signal output from the Q-terminal to the gate of the sixth switch SW6 via the inverter 358 serves as the sixth gate signal GS6. The sixth gate signal GS6 is obtained by inverting a logic of the fifth gate signal GS5.

Further, the control unit 30 has a polarity determiner 55 for determining a polarity of an actual voltage Vr based on a detection voltage Vac. The polarity determiner 55 outputs a high state polarity determination signal PS during a period during which the polarity of the actual voltage Vr is determined to be positive. By contrast, the polarity determiner 55 outputs a low state polarity determination signal PS during a period during which the polarity of the actual voltage Vr is determined to be negative.

Further, the polarity determination signal PS output from the polarity determiner 55 is input to the operation unit 56. The operation unit 56 supplies the polarity determination signal PS to each of gates disposed in the first and fourth switches SW1 and SW4 while maintaining a logic of the polarity determination signal PS. Hence, the polarity determination signal PS output from the operation unit 56 to the gate of the first switch SW1 serves as a first gate signal GS1. Also, the polarity determination signal PS output from the operation unit 56 to the gate of the fourth switch SW4 serves as a fourth gate signal GS4. Further, the polarity determination signal PS output from the polarity determiner 55 is also input to an inverter 359 disposed in the operation unit 56. Then, the polarity determination signal PS is inverted and input to gates of the second and third switches SW2 and SW3, respectively. Hence, the signal output from the inverter 359 to the gate of the second switch SW2 serves as a second gate signal GS2. Also, the signal output from the inverter 359 to the gate of the third switch SW3 serves as a third gate signal GS3.

Now, an exemplary operation of the power converter 100 is herein below described with reference to FIGS. 5A to 5G. First, FIG. 5A illustrates exemplary transitions of a detection voltage Vac and a DC voltage Vdc, respectively. FIG. 5B illustrates a transition of each of first and fourth gate signals GS1 and GS4. FIG. 5C also illustrates a transition of each of second and third gate signals GS2 and GS3. FIG. 5D illustrates a transition of each of a fifth gate signal GS5 and a signal obtained by inverting a sixth gate signal GS6. Further, FIG. 5E illustrates a transition of a command current ILa*. FIG. 5F illustrates a transition of a reactor current ILr. FIG. 5G also illustrates a transition of an output current Iac.

More specifically, the command current ILa* calculated by the control unit 30 has a waveform in which a positive half of a sine wave is repeated in a half cycle (T/2) thereof. In FIG. 5, an amount of command current ILa* varies in accordance with the waveform of the detection voltage Vac.

Further, in a first period P1 (=T/2) in which a polarity of the detection voltage Vac is positive during a first cycle T thereof, each of the first and fourth gate signals GS1 and GS4 is in a high state. At the same time, each of the second and third gate signals GS2 and GS3 is in a low state by contrast. With this, in the full bridge circuit 12, each of the first and fourth switches SW1 and SW4 is turned on, and each of the second and third switches SW2 and SW3 is turned off by contrast. Further, in such a first period P1, to control the reactor current ILr to approximate the command current ILa* by performing peak current mode control, the control unit 30 changes a duty ratio (=Ton/Tsw), which is a ratio of a turn on-period of each of the fifth and sixth gate signals GS5 and GS6 to a single switching period Tsw. Hence, an average value Iave of the reactor current ILr can be close to an amount of command current ILa*. At this moment, an amount of reactor current ILr in the single switching cycle Tsw varies in accordance the duty ratio of the fifth switch.

Further, In the second period P2 (=T/2) in which a polarity of the detection voltage Vac is negative, each of the first and fourth gate signals GS1 and GS4 is in a low state. At the same time, each of the second and third gate signals GS2 and GS3 is in a high state by contrast. With this, in the full bridge circuit 12, each of the first and fourth switches SW1 and SW4 is turned off. At the same time, each of the second and third switches SW2 and SW3 is turned on by contrast. Again, in the second period P2, to control the reactor current Ilr to approximate the command current ILa* in average by performing the peak current mode control, the control unit 30 changes a duty ratio of each of the fifth and sixth gate signals GS5 and GS6.

Further, phase deviation sometimes occurs in a detection voltage Vac from an actual voltage Vr. The phase deviation of the detection voltage Vac from the actual voltage Vr is caused by manufacturing variations and temperature characteristics of components constituting an AC voltage detector 23 or the like. The phase deviation of the detection voltage Vac from the actual voltage Vr also occurs when a low pass filter 243 disposed in a differential amplifier 233 included in the AC voltage detector 23 acts as a capacitance.

As a result, due to the deviation in phase of the detection voltage Vac from that of the actual voltage Vr, a timing when the detection voltage Vac becomes a reference voltage Vs deviates from a zero-cross timing at which the actual voltage Vr comes to zero. With this, a switching timing for switching turn on-off operations in each of the first to fourth switches SW1 to SW4 constituting the full bridge circuit 12 sometimes deviates from a timing when a polarity of the actual voltage Vr changes. As a result, an overcurrent sometimes flows through each of the first and second AC side terminals TA1 and TA2 as described herein below.

Figure 6A:
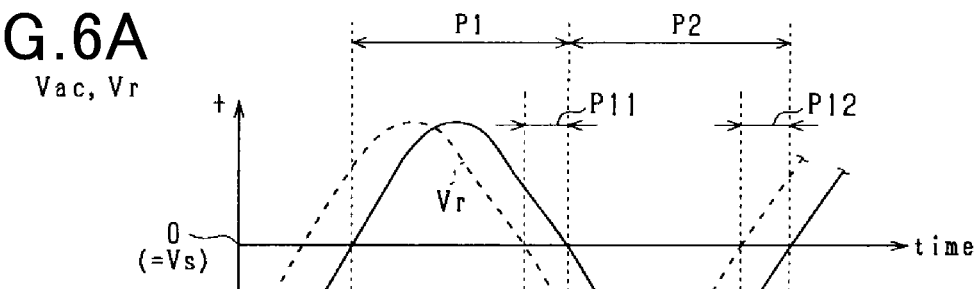
FIGS. 6A to 6D are graphs collectively illustrating an overcurrent flowing through each of first and second AC side terminals.
Figure 6B:
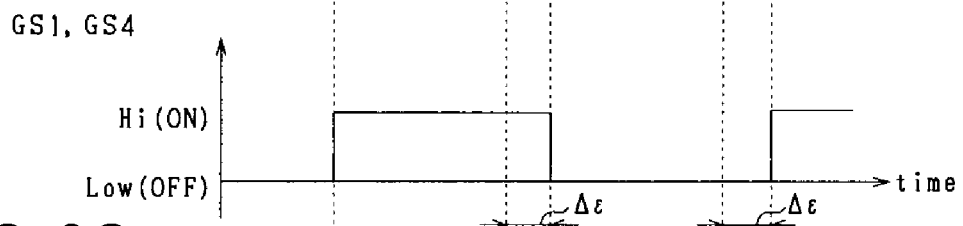
Figure 6C:
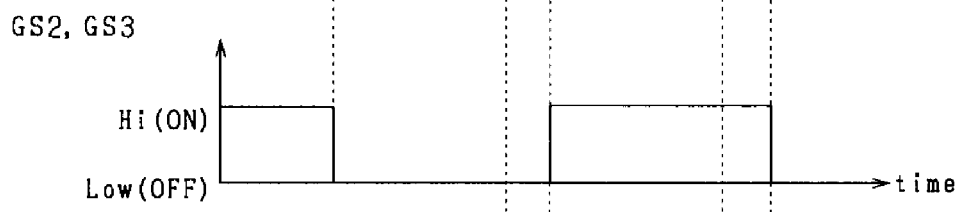
Figure 6D:
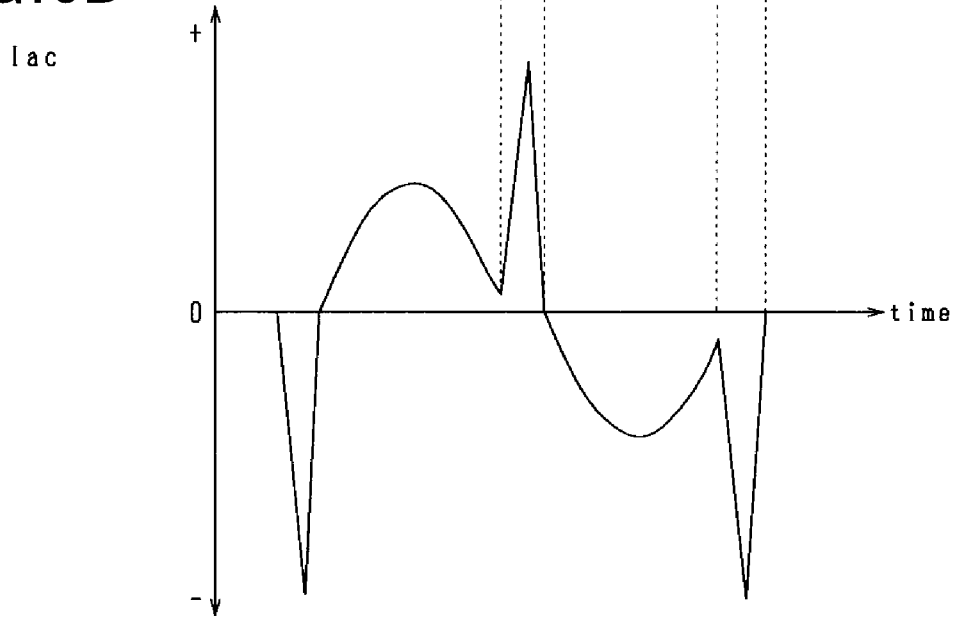

Now, the overcurrent flowing through each of the first and second AC side terminals TA1 and TA2 is described in detail with reference to FIGS. 6 and 7. FIG. 6A illustrates transitions of the detection voltage Vac and the actual voltage Vr. FIG. 6B illustrates a transition of each of the first and fourth gate signals GS1 and GS4. FIG. 6C also illustrates a transition of each of the second and third gate signals GS2 and GS3. FIG. 6D further illustrates a transition of the output current Iac. Further, 7A illustrates the full bridge circuit 12 and a flow path along which a current flowing through the AC power supply 200 during a period P11 shown in FIG. 6. Here, in FIG. 6A, for the purpose of simplicity, the detection voltage Vac and the actual voltage Vr are shown when the reference voltage Vs is zero. FIG. 7B also illustrates the full bridge circuit 12 and another flowing path along which a current flow through the AC power supply 200 during a period P12 shown in FIG. 6.

As shown, a phase of the detection voltage Vac shown by a solid line in FIG. 6A is delayed from that of the actual voltage Vr indicated by a broken line. With this, in the first period P1 in which the detection voltage Vac is positive, a falling timing of each of the first and fourth gate signals GS1 and GS4 is delayed by a time $\Delta\varepsilon$ from the zero-cross timing of the actual voltage Vr. Similarly, a rising timing of each of the second and third gate signals GS2 and GS3 is delayed by the amount of time $\Delta\varepsilon$ from the zero-cross timing of the actual voltage Vr. Further, although the actual voltage Vr is negative during the period P11, the detection voltage Vac detected by the AC voltage detector 23 has a higher value than zero (i.e., the reference voltage Vs).

Figure 7A:
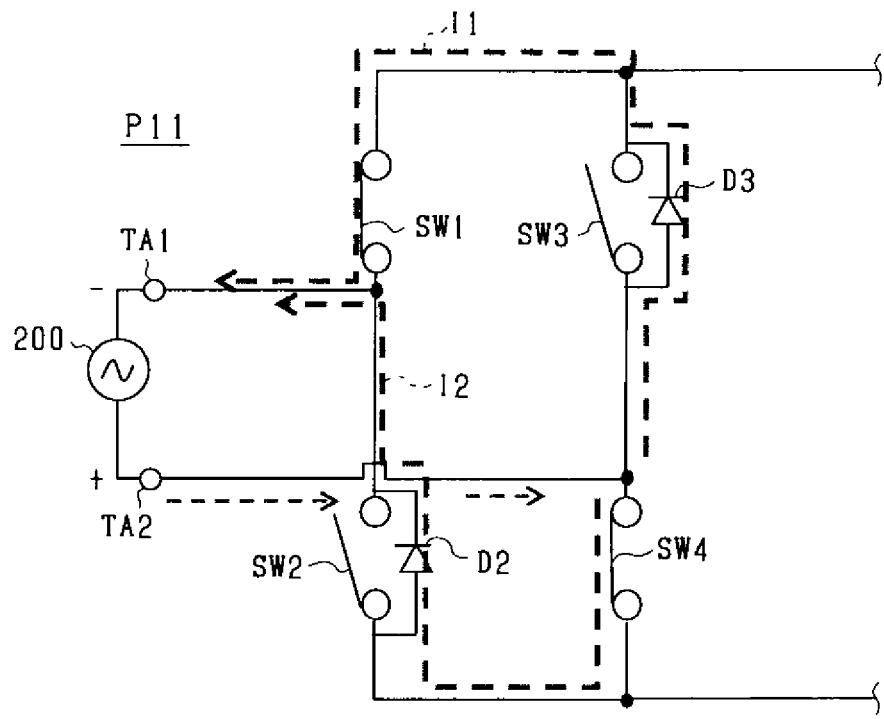
FIGS. 7A and 7B are circuits also collectively illustrating the overcurrent flowing through each of the first and second AC side terminals.
Figure 7B:
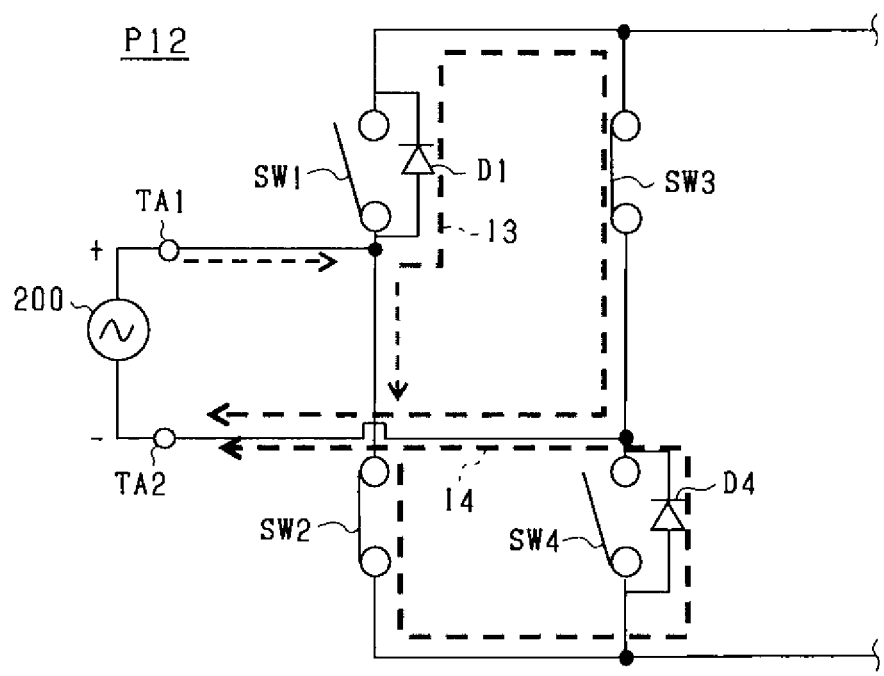

Further, in the period P11, as shown in FIG. 7A, since a negative actual voltage Vr is applied between the first and second AC side terminals TA1 and TA2, a first current I1 flows through a closed circuit formed by the body diode D3 of the third switch SW3 and the drain and source of the first switch SW1 in a direction from the first AC side terminal TA1 to the second AC side terminal TA2 via the AC power supply 200. Similarly, due to the negative actual voltage Vr, a second current I2 flows through a closed circuit formed by the body diode D2 of the second switch SW2 and the drain and source of the fourth switch SW4 in the direction from the first AC side terminal TA1 to the second AC side terminal TA2 via the AC power supply 200. Hence, during the period P11, as shown in FIG. 6D, the first current I1 and the second current I2 are added together, thereby allowing a spike-like overcurrent to flow.

Further, as shown in FIGS. 6A to 6D, during the period P12, a rising timing of each of the first and fourth gate signals GS1 and GS4 is delayed from a zero-cross timing of the actual voltage Vr by a time $\Delta\varepsilon$. Also, during the period P12, a fall timing of each of the second and third gate signals GS2 and GS3 is delayed from the zero-cross timing of the actual voltage Vr by a time $\Delta\varepsilon$. Further, during the period P12, although a polarity of the actual voltage Vr is positive, the detection voltage Vac detected by the AC voltage detector 23 is lower than zero (a reference voltage Vs). That is, a polarity thereof is negative.

Further, as shown in FIG. 7B, during the period P12, since the positive actual voltage Vr is applied between the first and second AC side terminals TA1 and TA2, a third current I3 flows through a closed circuit formed by the body diode D1 disposed in the first switch SW1 and the drain and source disposed in the third switch SW3 in a direction from the second AC side terminal TA2 to the first AC side terminal TA1 via the AC power supply 200. Similarly, since the positive actual voltage Vr is applied, a fourth current I4 flows through a closed circuit formed by the body diode D4 disposed in the fourth switch SW4 and a drain and a source disposed in the second switch SW2 in a direction from the second AC side terminal TA2 to the first AC side terminal TA1 via the AC power supply 200. Hence, during the period P12, a spike-like overcurrent flows due to summing of the third current I3 and the fourth current I4.

Further, in this embodiment, since the second reactor 20 is disposed in the fifth wiring LP5, an inductance of the second reactor 20 may either suppress or reduces the overcurrent flowing through the first and second AC side terminals TA1 and TA2.

Figure 8:
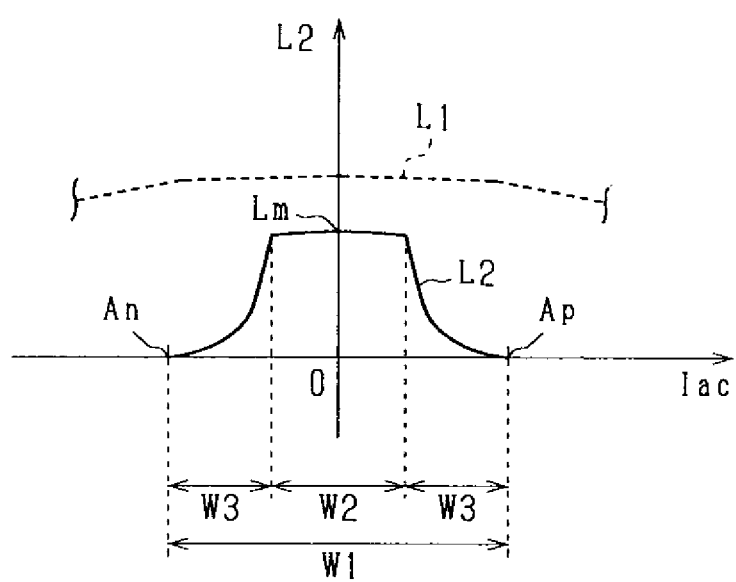
FIG. 8 is a graph illustrating an exemplary impedance of a second reactor according to one embodiment of the present disclosure.

FIG. 8 illustrates an exemplary DC superposition characteristic of the second reactor 20, in which a horizontal axis represents a current (i.e., an output current Iac) flowing through the second reactor 20 and a vertical axis represents an inductance. In the horizontal axis, a label Ap indicates a positive-side rated current capable of flowing through the second reactor 20. A label An indicates a negative rated current capable of flowing through the second reactor 20. That is, a range from the negative side rated current An to the positive side rated current Ap serves as a first current range W1 in which a current can flow through the second reactor 20. In this embodiment, an absolute value Ap is equal to an absolute value An (i.e., $|Ap|=|An|$). However, these can be different from each other (i.e., $|Ap|\neq|An|$).

Further, if an overcurrent flows in the vicinity of the zero-cross timing of the actual voltage Vr, an amt of output current Iac flowing into the first and second AC side terminals TA1 and TA2 greatly deviates from zero. In view of this, an inductance L2 of the second reactor 20 has a maximum value Lm in a second current range W2 symmetrically extended within the first current range W1 by a predetermined (current) width about zero (i.e., the vertical axis). This is because, if the inductance L2 of the second reactor 20 is relatively large in the vicinity of zero of the output current Iac, the second reactor 20 can either reduce or suppress an excessive change in output current Iac, and accordingly the overcurrent. Here, as shown, a central value of the second current range W2 is zero in this embodiment.

Further, the inductance L2 of the second reactor 20 is lower in a third current range W3 of the first current range W1 excluding the second current range W2 than an inductance of the second current range W2. This is because, if the inductance of the second reactor 20 is relatively small in the third current range W3, a decrease in current control performance in the peak current mode control can be either suppressed or reduced, thereby rarely deteriorating power conversion efficiency of the power converter 100. Such suppression of the decrease in current control performance in the peak current mode control can be realized if the inductance L2 is relatively small in the third current range W3 and thereby suppressing a decrease in peak value of the reactor current Ilr.

Further, in this embodiment, the power converter 100 is designed to operate in a power factor range of from about 0.9 to about 1, and the second current range W2 is determined to be about 60% of the first current range W1. This is because, if the power converter 100 is operated at a smaller power factor than the numeral 1, the output current Iac is offset from zero at a zero-cross timing of the actual voltage Vr, thereby increasing an absolute maximum value of an overcurrent. By contrast, when the power converter 100 is operated at about a power factor one, the output current Iac is ideally zero at the zero-cross timing of the actual voltage Vr. Hence, the second current range W2 may be narrower when the power converter 100 is operated at about the power factor one than the second current range W2 when the power converter 100 is operated at a smaller power factor than the numeral one. Further, in such a situation, the second current range W2 may be less than 60% and 30% or more of the first current range W1, for example. More specifically, the second current range W2 may be about 30% of the first current range W1.

Further, as shown, as the absolute value of the output current Iac increases, the inductance L2 decreases by contrast in the third current range W3 included in the first current range W1. Also, in this embodiment, the inductance L2 of the second reactor 20 is smaller than the inductance L1 of the first reactor 13 in the first current range W1. Further, a decrease ratio of the inductance L2 of the second reactor 20 due to an increase in absolute value of a current flowing through the second reactor 20 is larger than a decrease ratio of the inductance L1 of the first reactor 13 due to an increase in absolute value of a current flowing through the first reactor 13 in the third current range W3. More specifically, in the third current range W3, an inclination ($=\Delta L2/\Delta I2$) of a decrease amount $\Delta L2$ of the inductance L2 of the second reactor 20 relative to an increase amount $\Delta I2$ of an absolute value of a current flowing through the second reactor 20 is greater than an inclination ($=\Delta L1/\Delta I1$) of a decrease amount $\Delta L1$ of the inductance L1 relative to an increase amount $\Delta I1$ of an absolute value of a current flowing through the first reactor 13.

Further, in this embodiment, the inductance L2 of the second reactor 20 is zero (i.e., a value 0) when each of the positive-side rated current Ap and the negative rated current An flows therethrough. However, the inductance L2 can be greater than zero (i.e., $\geq 0$) at both the positive-side rated current Ap and the negative-side rated current An.

Further, the second reactor 20 is only needed to maintain the inductance L2 to be the maximum value Lm in the second current range W2 included in the first current range W1 and steeply reduce the inductance L2 in the third current range W3 therein, such as a saturated reactor, etc. Hence, the second reactor 20 can be an iron core-containing reactor, for example. That is, with the iron core-containing reactor, the second reactor 20 may be more effectively downsized as compared with an empty core reactor that excludes the core.

Further, the maximum value Lm of the inductance L2 of the second reactor 20 may be determined experimentally in consideration of the positive-side rated current Ap, the negative rated current An and the size of the second reactor 20 as well.

Now, with reference to FIGS. 9A to 10C, various advantages obtained by this embodiment will be described in detail. That is, as described earlier, FIG. 9A illustrates one cycle T of a transition of an actual voltage Vr of the AC power supply 200. FIG. 9B also illustrates such a transition of the output current Iac. FIG. 9C also illustrates a state of each of the first gate signal GS1 and the second gate signal GS2. In FIG. 9C, the second gate signal GS2 is shown by a broken line.

Figure 9A:
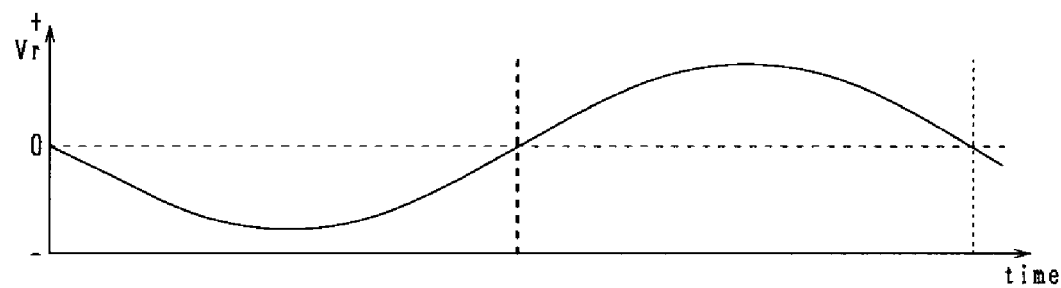
FIGS. 9A to 9C are graphs collectively illustrating operation and effect caused according to one embodiment of the present disclosure.
Figure 9B:
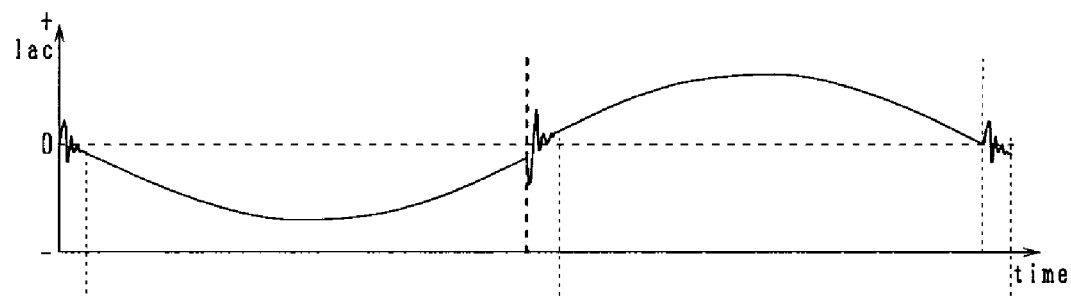
Figure 9C:
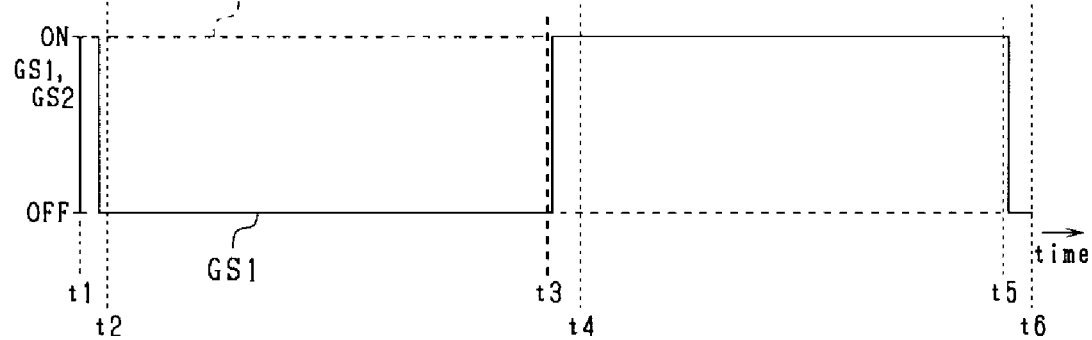

Specifically, as shown In FIG. 9A, a polarity of the actual voltage Vr is negative during a period of from a time t1 to a time t3, and is positive during a period of from a time t3 to a time t5. Hence, each of the times t1 and t5 is a zero-down cross timing of the actual voltage Vr. The time t3 is a zero-up cross timing of the actual voltage Vr. However, in each of the zero-cross timings t1, t3 and t5 of the actual voltage Vr, a deviation in phase of a detection voltage Vac from the actual voltage Vr occurs. As a result, each of rise and fall timings of the first and second gate signals GS1 and GS2 is delayed from each of the zero-cross timings.

Further, during the period from the zero-down cross timing at the time t1 to the time t2, based on a deviation in switching timing of each of the first and second gate signals GS1 and GS2, a spike-like overcurrent is generated in the output current Iac. However, in this embodiment, the second reactor 20 disposed in the fifth wiring LP5 either suppresses or reduces an increase in amplitude of the output current Iac during the period of from the time t1 to the time t2. Further, although a spike-like overcurrent is also generated in the output current Iac in both a period of from the time t3 to the time t4 and a period of from the time t5 to the time t6, the second reactor 20 similarly suppresses or reduces an increase in amplitude of the output current Iac.

Figure 10A:
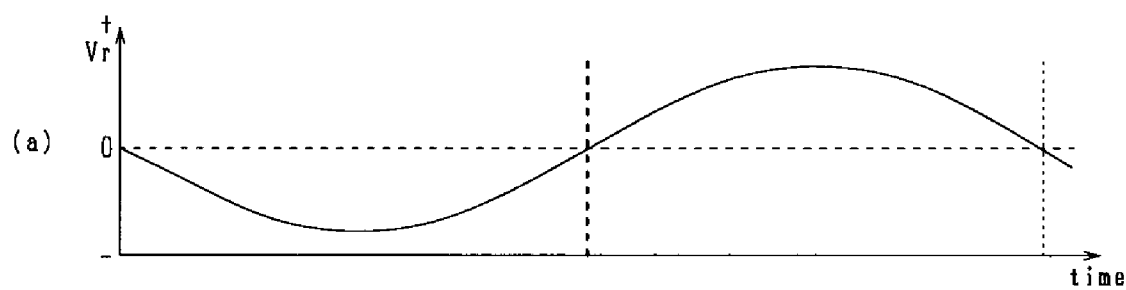
FIGS. 10A to 10C are graphs collectively illustrating operation and effect caused by a comparative example compared to one embodiment of the present disclosure.
Figure 10B:
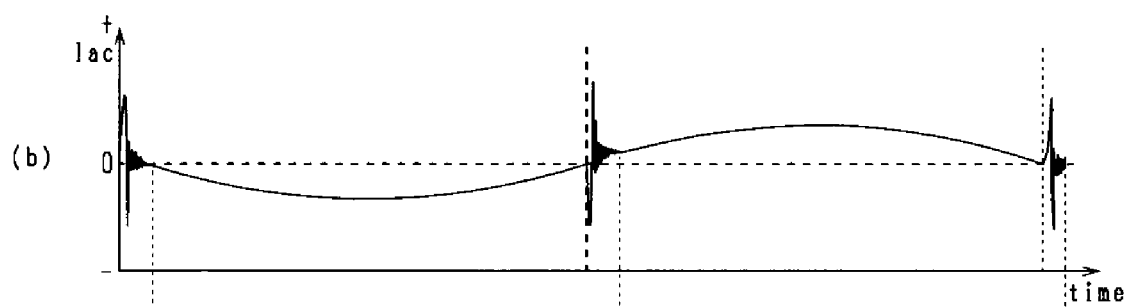
Figure 10C:
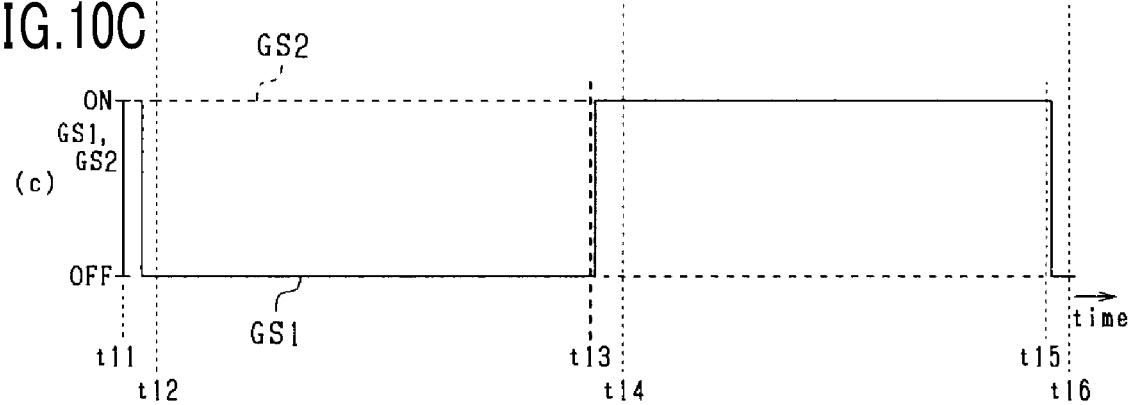

Further, FIGS. 10A to 10C collectively illustrate a comparative example, in which an actual voltage Vr, an output current and first and second gate signals GS1 and GS2 are generated in a power converter 100 that excludes the second reactor 20 from the fifth wiring LP5. Specifically, FIGS. 10A to 10C correspond to FIGS. 9A to 9C, respectively. Further, also in the comparative example of FIGS. 10A to 10C, times t11 and t15 are zero-down cross timings of the actual voltage Vr. Also, a time t13 is a zero-up cross timing of the actual voltage Vr.

Also, in the comparative example, a spike-like overcurrent occurs in the output current Iac in predetermined periods between the times t11 to t12, the times t13 to t14 and the times t15 to t16 including each of zero-cross timings t11, t13 and t15. However, in the comparative example, since the second reactor 20 is not disposed in the fifth wiring LP5, an amplitude of the output current Iac in each of the periods is greater than the amplitude of the output current Iac shown in FIG. 9.

Now, with reference to FIG. 11, a method of generating a reference correction value map described earlier with reference to FIG. 3 will be herein below described in detail. In the drawing, a symbol D shows a duty ratio of a turn-on period for a fifth switch SW5.

Specifically, in this embodiment, the deviation width Δi is obtained by subtracting the average value Iave of the reactor current ILr from a pre-correction command current IL*.

Figure 11:
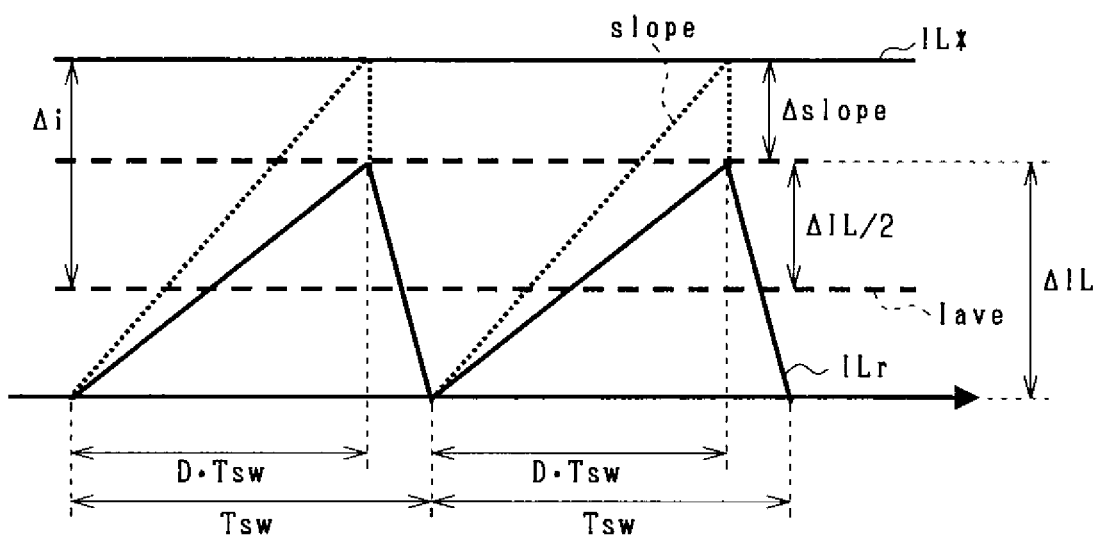
FIG. 11 is a graph schematically illustrating a method of creating a reference correction value map according to one embodiment of the present disclosure.

As understood from FIG. 11, the deviation width Δi can be obtained by adding a half amount (ΔIL/2) of a maximum increase ΔIL in reactor current ILr to a maximum increase Δslope in slope compensation signal Slope in the turn on-period (=D×Tsw). Hence, the deviation width Δi is calculated by the below described second equation.

$$\Delta I = IL^* - Iave = \Delta slope + \Delta IL/2 \quad \text{(Second Equation)}$$

Further, the amount of maximum increase ΔIL in reactor current ILr can be calculated by the below described third equation based on a voltage generated at both ends of the first reactor 13, the inductance L1 of the first reactor 13 and the inductance L2 of the second reactor 20.

$$\Delta IL = \frac{Vdc - \sqrt{2} \cdot Vrms \cdot |\sin\theta|}{L1 + L2} \cdot D \cdot Tsw \quad \text{(Third Equation)}$$

Further, the control unit 30 determines an amt of inductance L2 of the second reactor 20 based on an output current Iac detected by the output current detector 24. More specifically, in this embodiment, the control unit 30 includes a reactor map that determines a relation between an output current Iac and an inductance L2 of the second reactor 20. Hence, the control unit 30 can determine the amt of inductance L2 of the second reactor 20 in accordance with the output current Iac with reference to the reactor map. Hence, the control unit 30 corresponds to a second current acquirer according to one embodiment of the present disclosure.

Further, the amount of maximum increase Δslope in slope compensation signal Slope can be calculated by the below described fourth equation.

$$\Delta slope = ms \times D \times Tsw \quad \text{(Fourth Equation)}$$

Further, when the deviation width Δi is calculated, an average value of slopes ms may be used as the slope ms of the slope compensation signal Slope, for example.

Further, the duty ratio D of the turn-on period when the fifth switch SW5 is turned on can be calculated by the below described fifth equation based on the effective value Vrms of the detection voltage Vac.

$$D = \frac{\sqrt{2} \cdot Vrms \cdot |\sin\theta|}{Vdc} \quad \text{(Fifth Equation)}$$

Further, the deviation width Δi is calculated using the first equation by substituting the above-described second to fifth equations. Further, in this embodiment, the reference correction value Ih is calculated by using the deviation width Δi indicated by the above-described first equation. For example, a value obtained by multiplying a calculation coefficient α to the deviation width Δi can be used as the reference correction value Ih. Here, the calculation coefficient α can be greater than zero and equal to the numeral one or less. Then, by recording each of reference correction values Ih calculated in this way per effective value Vrms, the reference correction value map can be generated.

As described heretofore, according to the above-described embodiment, below described various advantages can be obtained.

First, the second reactor 20 is disposed in the fifth wiring LP5 connecting the first AC side terminal TA1 with the third connection point K3 located between the first switch SW1 and the second switch SW2 in a wiring. With this, even when a result of polarity determination by the polarity determiner 55 is delayed from a switching timing when a polarity of the actual voltage Vr is switched, the inductance L2 of the second reactor 20 disposed in the fifth wiring LP5 can suppress or reduce the overcurrent.

Secondly, the inductance L2 of the second reactor 20 is greater in the second current range W2 included in the first current range W1, defined by the positive-side rated current Ap and the negative side rated current An than that in the third current range W3. With this, in the second current range W2, the large inductance can either suppress or reduce an amount of increase in absolute value of the output current Iac and accordingly the overcurrent. Besides, because an inductance decreases in the third current range W3 lower than the second current range W2, a decrease in current control performance in the peak current mode control can be either suppressed or reduced. As a result, a decrease in conversion efficiency needed for the power converter 100 in the third current range W3 can be either suppressed or reduced.

Thirdly, an amt of the inductance L2 of the second reactor 20 decreases as an absolute value of the output current Iac increases in the third current range W3 included in the first current range W1. With this, since an influence of the second reactor 20 decreases when the output current Iac is relatively large than when the output current Iac is relatively small, a decrease in power conversion efficiency in a high-power side can be either suppressed or reduced.

Fourthly, the inductance L2 of the second reactor 20 is smaller than the inductance L1 of the first reactor 13 in the first current range W1. With this, a decrease in current control performance of the peak current mode control can be either suppressed or reduced more effectively in the first current range W1.

Now, various modifications are herein below described. First, the second reactor 20 can be disposed in the sixth wiring LP6 that connect the second AC side terminal TA2 with the second connection point K2 located between the third switch SW3 and the fourth switch SW4 in a wiring. Further, the second reactor 20 can be disposed in each of the fifth wiring LP5 and the sixth wiring LP6. In these situations, substantially the same advantage can be obtained as in the first embodiment.

Secondly, the inductance L2 of the second reactor 20 can be larger than the inductance L1 of the first reactor 13 in the first current range W1.

Thirdly, each of the first to fourth switches SW1 to SW4 can employ an IGBT (Insulated Gate Bipolar Transistor). In such a situation, instead of the above-described body diode, a freewheel diode can be connected in reverse parallel to each of the first to fourth switches SW1 to SW4.

Fourthly, in addition to converting the DC voltage into the AC voltage, a power converter 100 can serve as a bidirectional power converter to convert one of a DC voltage and an AC voltage input thereto into the other one of a DC voltage and an AC voltage. When the power converter 100 converts the AC voltage into the DC voltage, the sixth switch SW6 corresponds to a drive switch.

Fifthly, the reference voltage generator 231 is not limited to the voltage dividing circuit with the resistances, and is only needed to generate the reference voltage Vs. Hence, the reference voltage generator 231 can be a switching power supply.

Sixthly, instead of performing the peak current mode control, the control unit 30 can perform average current mode control to output a fifth gate signal GS5 for actuating the fifth switch SW5.

Seventhly, the control unit and method described heretofore in the present disclosure may be realized by a dedicated computer prepared by including a memory and a processor programmed to perform one or more functions embodied by computer program. Alternatively, the control unit and method described heretofore in the present disclosure can be realized by a dedicated computer prepared by including a processor composed of one or more dedicated hardware logic circuits. Otherwise, the control unit and method described heretofore in the present disclosure can be realized by one or more dedicated computers prepared in combination with a processor programmed to perform multiple functions, a memory and another processor configured by one or more hardware logic circuits. Further, the computer program may be stored in a computer readable non-transitory tangible recording medium as an instruction executed by a computer.

Numerous additional modifications and variations of the present disclosure are possible in light of the above teachings. It is therefore to be understood that within the scope of the appended claims, the present disclosure may be executed otherwise than as specifically described herein. For example, the present disclosure is not limited to the above-described power converter and may be altered as appropriate.

What is claimed is:

1. A power converter comprising:
   a first reactor;
   a first AC side terminal connectable to an AC power supply;
   a second AC side terminal connectable to the AC power supply;
   a first DC side terminal connectable to a DC power supply;
   a second DC side terminal connectable to the DC power supply;
   a full bridge circuit disposed between each of the first and second AC side terminals and the first reactor, the full bridge circuit having:
      a first serial coupling composed of a series of a first switch and a second switch;
      a second serial coupling composed of a series of a third switch and a fourth switch, the first and second serial couplings being connected in parallel to each other;
      four diodes connected to the first to fourth switches in reverse parallel to the first to fourth switches, respectively;
      a first connection point located between the first switch and the second switch in a wiring, the first connection point being connected to the first AC side terminal; and
      a second connection point located between the third switch and the fourth switch in the wiring, the second connection point being connected to the second AC side terminal;
   a voltage detector to detect a voltage of the AC power supply and to generate a detection voltage with a given waveform;
   a control unit to perform at least one of first and second functions, the control unit being configured to:
      convert an AC voltage supplied from the AC power supply through each of the first and second AC side terminals into a DC voltage and outputting a conversion result through each of the first and second DC side terminals as the first function;
      convert a DC voltage input through each of the first and second DC side terminals into an AC voltage and outputting a conversion result through each of the first and second AC side terminals as the second function;
      determine if a polarity of an actual voltage value of the AC power supply is either positive or negative based on the detection voltage generated by the voltage detector; and
      alternately actuate a set of the first switch and the fourth switch and another set of the second switch and the third switch each time when it determines, based on the detection voltage, that the polarity of the actual voltage value of the AC power supply changes; and
   a second reactor disposed at at least one of first and second positions, the first position being located between the first AC side terminal and the first connection point in the wiring, the second position being located between the second AC side terminal and the second connection point in the wiring, the second reactor suppressing a change in current flowing through the first and second AC side terminals based on an inductance thereof when a phase of the detection voltage deviates from a phase of an actual alternating voltage of the AC power supply by a given amount.

2. The power converter as claimed in claim 1, wherein the second reactor has an impedance defined by a graph in a coordinate system having a Y-axis indicating the inductance and a X-axis indicating a current, the graph having a first current range defined by a positive-side rated current flowing through the second reactor and a negative side rated current flowing through the second reactor, the first current range including a second current range symmetrically extended about the Y-axis as a part of the first current range, the first current range further including a pair of symmetrical third current ranges as a remaining range in the first current range, wherein an inductance of the second current range is larger than each of the pair of third current ranges.

3. The power converter as claimed in claim 2, wherein the inductance of the second reactor decreases in each of the pair of third current ranges as an absolute value of a current flowing through the second reactor increases.

4. The power converter as claimed in claim 2, wherein the inductance of the first current range of the second reactor is smaller than an inductance of the first reactor.

5. The power converter as claimed in claim 2, wherein a ratio of decreasing in inductance of the second reactor in accordance with an increase in absolute value of a current flowing through the second reactor is larger in the third current range than a ratio of decreasing in inductance of the first reactor in accordance with an increase in absolute value of a current flowing through the first reactor.

6. The power converter as claimed in claim 2, wherein the second current range is between about 30% and about 60% of the first current range.

7. The power converter as claimed in claim 1, wherein the control unit further includes:

a first current acquirer to acquire a value of a reactor current flowing through the first reactor;

a command current calculator to calculate a command current in a sine wave state in accordance with the detection voltage of the AC power supply;

a command current corrector to correct the command current and generate a corrected command current based on a current correction value;

a current controller to actuate at least one drive switch by performing peak current mode control to control the reactor current flowing through the first reactor to approximate the corrected command current generated by the command current corrector; and a second current acquirer to acquire a value of current flowing through the second reactor, wherein the current correction value is determined based on the value of current flowing through the second reactor obtained by the second current acquirer.

8. The power converter as claimed in claim 7, wherein the current correction value is calculated by the below described equation, wherein Ih is the current correction value, Vrms is an effective value of the AC voltage of the AC power supply, θ (theta) is a phase of the detection voltage, Vdc is a DC voltage, Tsw is a single switching cycle of the drive switch, L1 is an inductance of the first reactor, and L2 is the inductance of the second reactor, $$Ih = \text{ms} \cdot \frac{\sqrt{2} \cdot Vrms \cdot |\sin\theta|}{Vdc} \cdot Tsw + \frac{\sqrt{2} \cdot Vrms \cdot |\sin\theta|(Vdc - \sqrt{2} \cdot Vrms \cdot |\sin\theta|)}{2(L1 + L2)Vdc} \cdot Tsw.$$

* * * * *